(12) United States Patent
Kremer

(10) Patent No.: US 6,644,453 B2
(45) Date of Patent: Nov. 11, 2003

(54) WAVED FRICTION PLATE AND ASSEMBLY

(75) Inventor: John M. Kremer, Sterling Heights, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/075,104

(22) Filed: Feb. 11, 2002

(65) Prior Publication Data

US 2003/0150686 A1 Aug. 14, 2003

(51) Int. Cl.⁷ .................................... F16D 13/69
(52) U.S. Cl. ................... 192/107 C; 192/52.3; 192/70.14
(58) Field of Search ............... 192/52.2, 52.3, 192/70.14, 70.28, 107 R, 107 C

(56) References Cited

U.S. PATENT DOCUMENTS

| 1,541,883 A | * | 6/1925 | Wemp ................. 192/107 C |
| 2,135,126 A | * | 11/1938 | Harwood ............. 192/107 M |
| 2,175,418 A | * | 10/1939 | Wales ................. 192/107 C |
| 3,520,389 A | * | 7/1970 | Smales ................ 192/107 R |
| 4,077,107 A | | 3/1978 | Reuter |
| 4,139,085 A | | 2/1979 | Kanbe et al. |
| 4,301,904 A | | 11/1981 | Ahlen |
| 4,548,311 A | | 10/1985 | Lech, Jr. |
| 5,004,089 A | | 4/1991 | Hara et al. |
| 5,093,057 A | | 3/1992 | Hara et al. |
| 5,657,845 A | | 8/1997 | Szadkowski et al. |
| 5,819,888 A | | 10/1998 | Tamura et al. |
| 5,878,860 A | | 3/1999 | Pavangat et al. |
| 5,906,255 A | | 5/1999 | Lee |
| 5,908,100 A | | 6/1999 | Szadkowski et al. |
| 6,189,669 B1 | | 2/2001 | Kremer et al. |
| 6,244,407 B1 | | 6/2001 | Kremer et al. |

FOREIGN PATENT DOCUMENTS

| EP | 0 267 027 | | 5/1988 |
| JP | 9-166157 A | * | 6/1997 |

* cited by examiner

*Primary Examiner*—Richard M. Lorence
(74) *Attorney, Agent, or Firm*—Emch, Schaffer, Schaub & Porcello Co., L.p.A.

(57) ABSTRACT

A friction plate and friction facing material assembly includes a friction plate having a waved or sinusoidal annular shape and friction material mounted on at least a portion of the friction plate. The waved friction plate defines a plurality of upwardly extending sections having no friction material thereon.

15 Claims, 4 Drawing Sheets

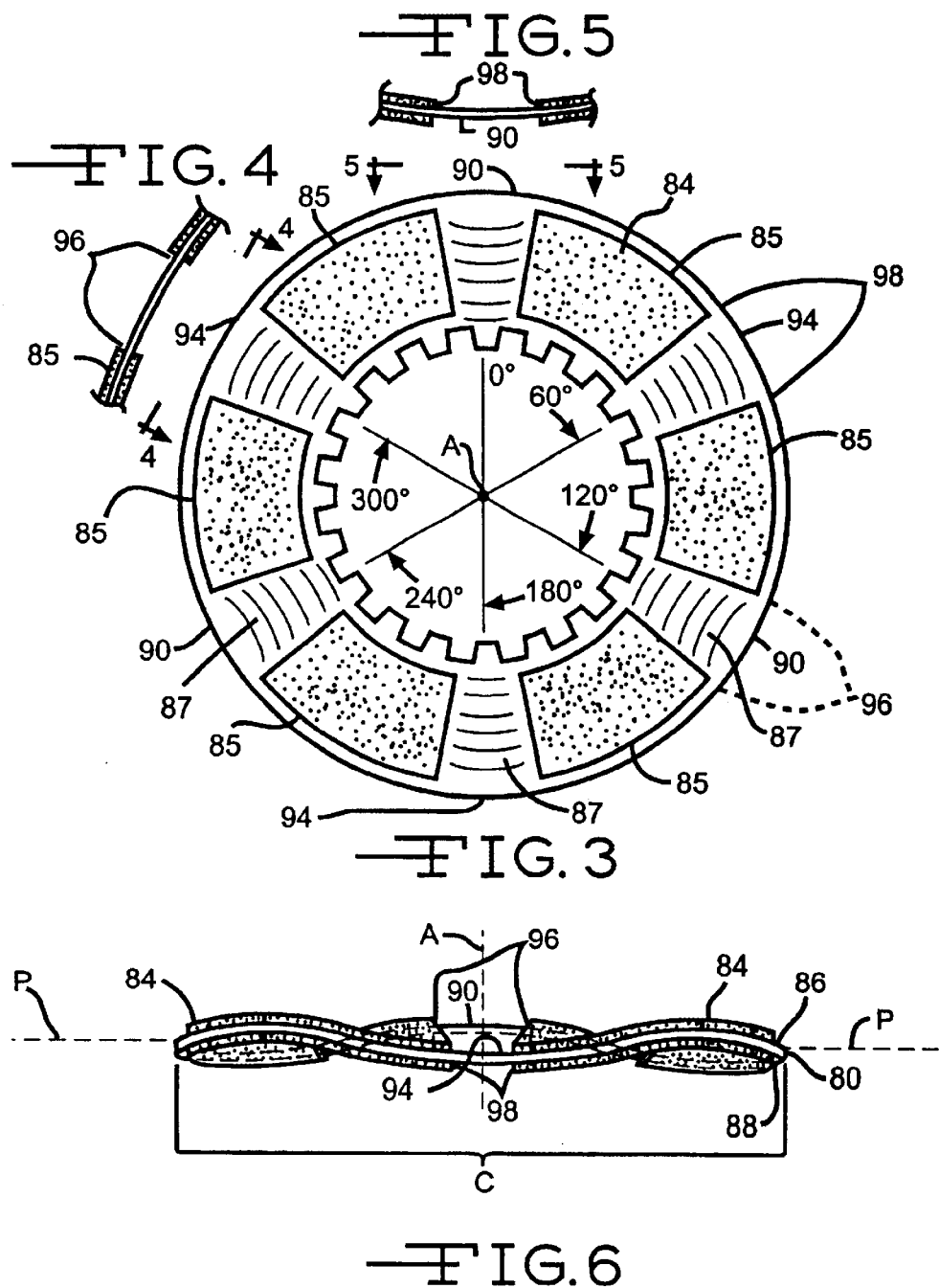

WAVED FRICTION PLATE AND ASSEMBLY

FIELD OF THE INVENTION

The present invention relates generally to a friction plate and assembly for use in clutches or brake assemblies for transmissions, differentials or brake systems. Specifically, the present invention relates to a waved friction plate having selectively applied friction material that exposes crests and troughs of a waved plate core. The exposed crests and troughs of the friction plate act as low rate springs to push the waved friction plate away from a separator plate to reduce power loss from shearing of cooling fluid.

BACKGROUND OF THE INVENTION

Plate and facing assemblies are known in the art and are used in multi-disk friction devices such as clutches or brakes. The friction devices are used in different capacities, and are commonly found in vehicle power train and brake applications. The power train's main component is typically referred to as "a transmission". Engine torque and speed are converted in the transmission in accordance with the tractive-power demand of the vehicle. Transmissions include one or more gear sets which may include an inner sun gear, intermediate planet gears which are supported by their carriers, and outer ring gears. Various components of the gear sets are held or powered to change the gear ratios in the transmission. The multi-disk pack clutch is a friction device which is commonly employed in a transmission or differential. In addition, multi-disk friction devices are also used in industrial applications such as wet brakes, for example, to brake the wheels on earth moving equipment.

A multi-disk pack clutch or brake assembly includes a clutch subassembly having a set of flat plates and a set of flat friction disks which are interleaved between one another. The friction plate is a flat annular plate mounted on a cylindrical core which cooperates with a flat annular separator plate. Various types of friction materials are secured on the core plate and are arranged in different configurations in order to provide flow passages for the cooling fluid. The plates and friction disks are immersed in a continual flow of lubricant material. In an open pack operation the friction disks and separator plate normally turn past one another with nominal contact. The clutch or plate assembly also includes a piston. In certain applications, it is known to employ several multi-disk pack friction devices in combination in order to establish different drive connections throughout the transmission or differential in order to provide various gear ratios in operation.

The confronting faces of the interleaved plates and disks are covered with frictional materials. When a friction device is engaged, kinetic energy is converted into thermal energy and a considerable amount of heat is generated. If the frictional surfaces of the disks and plates gets too hot, the plates or disks can suffer thermal damage. This causes damage to the friction material and degrades the clutch or brake operational effectiveness. Therefore, it is desired to have the heat which is generated when the friction device is engaged be efficiently dissipated.

For friction materials that are used in passenger car transmissions, for example, it is desired that the friction materials have a high dynamic coefficient of friction and a low static coefficient of friction so that there is little shudder or shock during engagement of the clutch or brake assembly. Typically, the coefficient of friction for friction material-on-steel is about 0.12.

Accordingly, there is a need for a friction plate that is both durable and shudder resistant.

It is a primary object of the present invention to reduce open pack spin losses.

Other objects and advantages of the present invention will become apparent to those skilled in the art upon a review of the following detailed description of the preferred embodiments and the accompanying drawings.

SUMMARY OF THE PRESENT INVENTION

A friction plate has a waved or sinusoidal annular shape. The waved friction plate defines at least one crest and trough. Friction material is selectively applied to at least one side of the waved friction plate such that at least one area or section of the waved plate has no friction material thereon. The exposed section of the waved friction plate allows metal-to-metal contact between the waved friction plate and an adjacent separator plate during opening pack operating conditions.

The crests and troughs of the waved friction plate cause the waved plate to act as a low rate spring. The waved friction plate is pushed away from the separator plates thereby reducing power losses due to shearing of the automatic transmission fluid.

BRIEF DESCRIPTION OF THE DRAWINGS

FIG. 3 is an axial view of a waved friction plate.

FIG. 4 is a view taken along the line 4—4 in FIG. 3.

FIG. 5 is a view taken along the line 5—5 in FIG. 3.

FIG. 6 is an end view, partially in phantom, of a waved friction plate.

DETAILED DESCRIPTION OF THE PREFERRED EMBODIMENT

Figure 1:
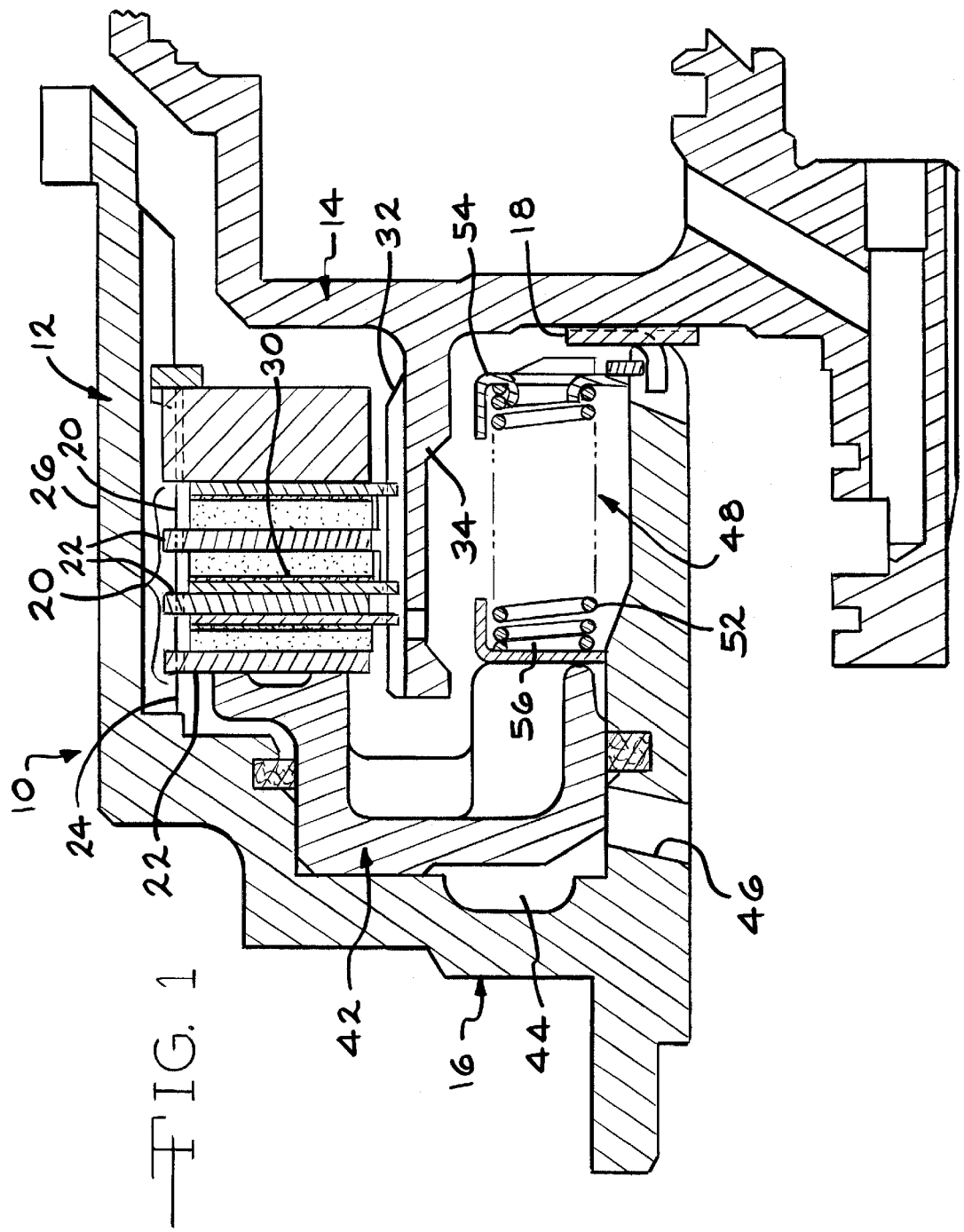
FIG. 1 is a partial cross-sectional view illustrating a clutch pack assembly having waved friction plates in a friction device.

Referring now to FIG. 1, a friction device such as a clutch or brake assembly is generally indicated at 10. The friction device 10 is adapted to be employed in connection with a transmission, differential, or brake system. For example, as is commonly known in the art, but not included in these figures, transmission assemblies include an input shaft which is operatively connected to an internal combustion engine. In an automotive application, the transmission assembly also includes an output shaft which is operatively connected to driven wheels through other drive train components such as a drive shaft and an axle having a differential. At least one, and often a plurality of, gear sets are operatively coupled between the input shaft and the output shaft. The transmission casing supports the input shaft, the output shaft and the gear sets of the transmission assembly.

Various components of the gear sets are held or powered to change the gear ratio in the transmission. To this end, the transmission assembly will generally include at least one friction device 10. However, it should be understood that those skilled in the art realize that the transmission assemblies may employ any number of friction devices adapted to hold or power gear sets to change the gear ratio of the transmission. Further, it is to be understood by those skilled in the art that the present invention may be employed in a transmission, differential or brake system whether used in automotive, non-automotive or industrial applications. Therefore, it is to be understood that the term "clutch" used in the instant application is to be given its broadest possible meaning including, but not limited to clutches and brakes for using transmissions, differential or braking systems of all types.

Referring again to FIG. 1, the friction device 10 includes a drive member generally indicated at 12 and a driven member 14, both of which are rotatable about a common axis (not shown) and which define a clutch housing 16. A thrust bearing 18 is interposed between the drive member 12 and the driven member 14 to support axial loads which can occur between the various components in a transmission.

An annular clutch pack 20 is interposed between the drive member 12 and the driven member 14 and operates to disconnect the drive member 12 and driven member 14 for translating and interrupting torque therebetween.

The clutch pack 20 includes a plurality of annular separator plates 22 splined at 24 to a drive hub 26. A plurality of annular waved friction plates 30 are splined at 32 to a driven hub 34. The waved friction plates 30 are interleaved between the separator plates 22.

Together, the separator plates 22 and waved friction plates 30 of the annular clutch pack 20 define an outer diameter roughly at the spline 24 of the drive hub 26 and an inner diameter roughly at the spline 32 of the drive hub 34.

During certain periods of operation of the friction device 10, the separator plates 22 and waved friction plates 30 rotate pass one another. The separator plates 22 and the waved friction plates 30 are also axially moveable relative to their respective splined hubs 26, 34 to come into friction engagement, thereby reducing or eliminating relative rotation between the separator plates 22 and the waved friction plates 30.

Axial movement is achieved through the actuation of a piston assembly generally indicated at 42 which is supported in the clutch housing 16. The piston assembly 42 and the clutch housing 16 cooperate to define an expandable chamber 44 between the piston assembly 42 and the clutch housing 16. A source of pressurized fluid (not shown) is in communication with the expandable chamber 44 via a pressure port 46. The piston assembly 42 is responsive to the pressure fluid in the expandable chamber 44 to move between a disengaged and engaged positions, thereby actuating the clutch pack 20 to connect and disconnect the drive member 12 and the driven member 14, as discussed above.

A biasing member generally indicated at 48 may be employed to move the piston assembly 42 to its disengaged position. The biasing member 48 is supported in the clutch housing 16. In the embodiment illustrated in FIG. 1, the biasing member 48 is a return spring assembly having a coiled spring 52 captured within a retainer 54 with one end of the spring 56 biased against the piston assembly 42. It is to be understood that the biasing member 48 may include any biasing mechanism conventionally known in the art and is not limited to a coil spring.

In operation, just before the clutch pack 20 is engaged, the separator plates 22 and the waved friction plates 30 rotate about an axis A, as shown by the point A in FIG. 3, and come into frictional contact with one another until the relative rotational speed between the separator plates 22 and the waved friction plates 30 become zero. In this disposition, the separator plates 22 and waved friction plates 30 are either rotating together at one speed or both held against rotation, depending on the particular application in a transmission, differential or brake system. In any application, during engagement of the separator plates 22 and the waved friction plates 30, kinetic energy is converted to thermal energy and a considerable amount of heat is generated.

Figure 2:
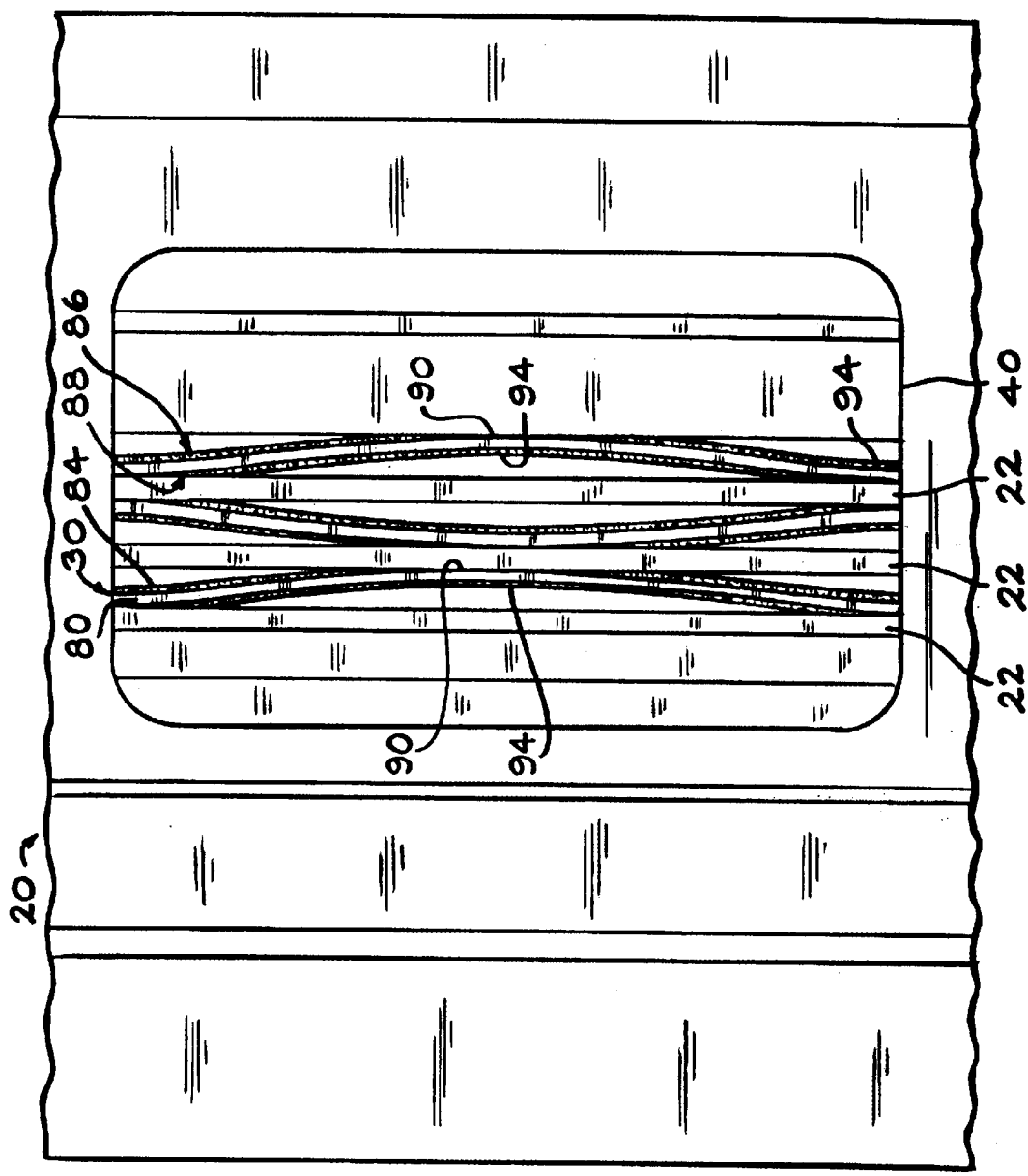
FIG. 2 is a partial radial view illustrating a part of a clutch pack assembly having waved friction plates.

Referring now to FIG. 2, in particular, a portion of the annular clutch pack 20 is shown in detail. The waved friction plate 30 comprises a core 80 and friction material 84. The waved friction plate 30 has an annular, or circular shape, as seen in FIG. 3.

The waved friction plate 30 has a waved shape, as seen in FIG. 2 and as schematically depicted in FIGS. 3 and 6. Referring again to FIG. 2, the waved friction plate 30 has a first side 86 and an opposing or second side 88. The waved friction plate 30 has at least one, and in certain embodiments, a plurality of, upwardly extending peak or crest sections 90 and at least one, and in certain embodiments, a plurality of, downwardly extending valley or trough sections 94. In the embodiment shown in FIG. 3, the troughs 94 define a low point at approximately 60°, 180° and 300° while the crests 90 define a high point at approximately 0°, 120° and 240°. In the embodiment shown in FIG. 3, the waved friction plate 30 has a plurality of sections 85 of the friction material 84 positioned circumferentially on the first side 86 around at least a portion of the annular surface of the waved friction plate 30. In the embodiment shown in FIG. 3, a plurality of exposed sections 96 and 98 of the core 80 are free of friction material, upwardly extending high midpoint or arc sections 96 define the crests 90 while downwardly extending low midpoint or arc sections 98 define the troughs 94.

In the embodiment shown in FIG. 3, the troughs 94 define approximately a 22°–25° angle such that approximately 35% to about 40%, and in certain other embodiments, about 35% to about 38% of the surface of the friction plate 30 is exposed core 80 with no friction material. In such embodiments, the friction material 84 covers about 60% to about 65%, and in certain other embodiments, about 62% to about 65%, of the annular surface of the waved friction plate 30.

That is the waved friction plate 30 has a circular shape that defines an outer circumference C and further defines an axis extending perpendicularly from a center point A of the plate. At least one section 96 of the plate 30 extends in an axial upward direction from a plane P defined as being perpendicular to the center point, and to opposing points on the circumference of the circular waved friction plate 30. Each of the axially upwardly extending sections 96 define a curved annular arc has no friction material thereon. In the embodiment shown, the friction plate 30 defines at least three axially extending sections 96 which extend in an upward direction from the plane P and at least three axially extending sections 98 which extend in a downward direction. In the embodiment shown, each of the axially extending sections 96, 98 is substantially evenly spaced apart adjacent sections.

It is to be understood that alternative constructions with varying numbers of crest and trough sections are within the contemplated scope of the present invention.

In the embodiment shown in FIG. 3, each upwardly extending section 90 is adjacent a downwardly extending section 94 such that the distance between a center high point section 90 and a center low point of the section 94 defines an arc of about 60°. The difference in height, or axial distance, between the high midpoint and the adjacent low midpoint is about 0.010 to about 0.015 inches.

Figure 7:
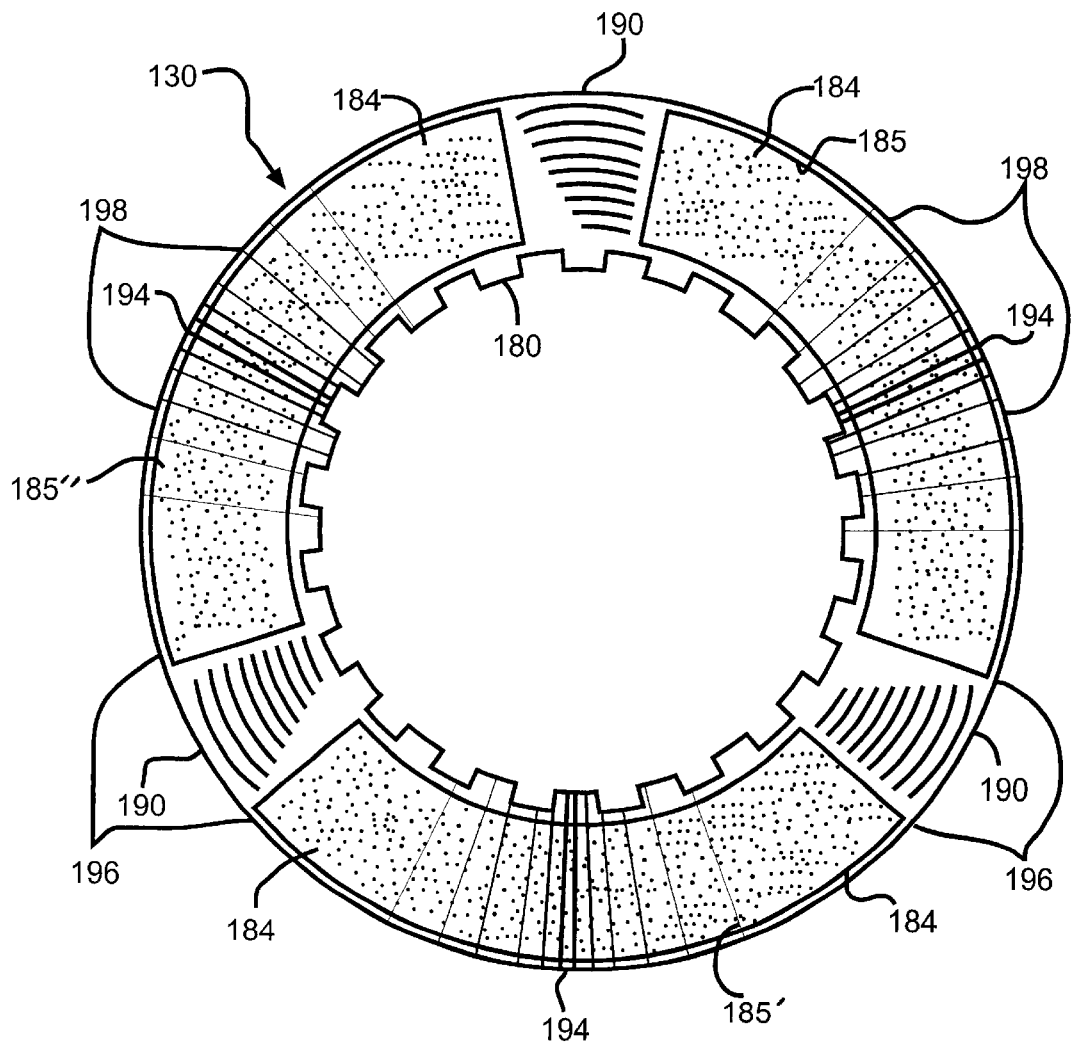
FIG. 7 is a top plan view of another embodiment of a waved friction plate.

In the embodiment shown in FIG. 7, a waved friction plate 130 has crests 190 and troughs 194. The high midpoint sections 96 of the crests 190 on the surface of the plate 130 are exposed while the low midpoint sections 198 are covered with friction material 185 such that approximately 75% to about 85% and in certain other embodiments, about 80 to 82%, of the annular surface of the wave friction plate 130 is covered with friction material 84. In such embodiments, approximately 15% to 25%, and in certain other embodiments, about 18% to about 20% of the surface of the waved friction plate 130 is exposed core 180.

FIG. 7 shows that the waved friction plate 130 has high middle sections 196 of the crests 190 with no friction material thereon at 0°, 120° and 240° while the low midpoint sections 196 are covered with friction sections 185, 185' and 185" of friction material 184 at 60°, 180° and 300°.

The waved friction plate is formed of a metal material such as steel or suitable steel alloys and other suitable materials. The core 80 has a preferred thickness of about 0.025 to about 0.060 inches and has a height extending from a high point of one crest to an opposing low point on an adjacent trough of about 0.010 to about 0.015 inches. In the embodiment shown, the friction plates have thickness of about 0.060 to about 0.120 inches. The thickness of the core allows the friction plate to have a desired spring action. That is, while each waved friction plate has a relatively low spring rate, the cumulative spring action of multiple waved friction plates allows the clutch pack 20 to operate with increased efficiency. The "lower" spring rate of each individual waved friction plate provides that a lower ultimate torque pressure is required in order to compress the waved plates against the opposing separator plates. In certain embodiments, the waved friction plate has a compression force of between about 10 to 20 lbs to compress the spring approximately 0.015 inches.

In operation, the waved friction plate 30 is compressed in an axial direction such that the waved plate crest 90 first engages the opposing separator plate 22. As the waved friction plate 30 contacts the separator plate 22, the speed of rotation decreases as the axial pressure is applied to the waved friction plate 30 such that more surface area of the midsection 96 of the crest 90 comes into contact with the separator plate 22. Additional force on the waved friction plate 30 causes the intervening friction material sections 85 to also engage the surface of the separator plate 22.

As the waved friction plate 30 comes into contact with the opposing separator plate 22, the high midsections 96 of the crests 90 are the first to contact the separator plate 22. In the embodiment shown, the dynamic coefficient of friction of steel-on-steel is about 0.04 during open pack operations.

As more pressure is applied, the waved friction plate 30 is deformed into a more planar, or flat, as opposed to waved, shape. The friction material sections 85 of the waved plate 30 begin to come into contact with the separator plate 22. As still more pressure is applied, the waved friction plate 30 deforms even more, and the friction material sections 85 more fully contact the separator plate 22. In the embodiment shown, the friction material-on-steel dynamic coefficient of friction is about 0.15.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. A waved friction plate and friction facing material assembly comprising a friction plate, and a friction material mounted on at least portion of the friction plate, the friction plate having a waved or sinusoidal annular shape;

wherein the waved friction plate defines at least one upwardly extending section, the upwardly extending section having no friction material thereon.

2. The assembly of claim 1, wherein the waved friction plate defines at least one downwardly extending section adjacent the upwardly extending section.

3. The assembly of claim 2, wherein the waved friction plate is free of friction material at the upwardly extending section and at the downwardly extending section.

4. The assembly of claim 1, wherein the waved friction plate has a circular shape and further defines an axis extending perpendicularly from a center point of the waved friction plate, wherein at least one section of the waved friction plate extends in an axial upward direction from a plane defined by the center point and a point on the circumference of the waved friction plate.

5. The assembly of claim 4, wherein a plurality of axially extending sections extend from plane defined by the center point and the point on the circumference of the waved friction plate.

6. The assembly of claim 5, wherein the waved friction plate defines at least three axially extending sections which extend in an upward direction from the plate and at least three axially extending sections which extend in a downward direction.

7. The assembly of claim 6, wherein each of the axially extending sections is substantially evenly spaced apart from adjacent sections.

8. The assembly of claim 7, wherein each of the axially upwardly extending sections define an arc section having no friction material thereon.

9. The assembly of claim 8, wherein each of the arc sections define an angle of about 22–25°.

10. The assembly of claim 8, wherein each of the axially downwardly extending sections defines an arc section having no friction material thereon.

11. The assembly of claim 9, wherein about 75 to 85% of the waved friction plate has friction material thereon.

12. The assembly of claim 9, wherein about 60 to 65% of the waved friction plate has friction material thereon.

13. The assembly of claim 6, wherein each upwardly extending section defines a high mid point section and each downwardly extending section defines a low mid point section, whereby the distance between a center point of one high point section and a center point of an adjacent low point section defines an arc of about 60°.

14. The assembly of claim 13, wherein a difference in height, or axial distance, between the high mid point section and the adjacent low mid point section is about 0.010 to about 0.015 inches.

15. The assembly of claim 14, wherein the friction plate has a thickness of about 0.06 to about 0.12 inch.

* * * * *